(12) United States Patent
Robinson et al.

(10) Patent No.: US 9,769,116 B2
(45) Date of Patent: Sep. 19, 2017

(54) ENCAPSULATING TRAFFIC WHILE PRESERVING PACKET CHARACTERISTICS

(71) Applicants: Robert Robinson, Waterloo (CA); Jakub Schmidtke, Waterloo (CA); Severn Tsui, Waterloo (CA); Nicholas Armstrong, Waterloo (CA)

(72) Inventors: Robert Robinson, Waterloo (CA); Jakub Schmidtke, Waterloo (CA); Severn Tsui, Waterloo (CA); Nicholas Armstrong, Waterloo (CA)

(73) Assignee: WILMERDING COMMUNICATIONS LLC, San Antonio, TX (US)

(*) Notice: Subject to any disclaimer, the term of this patent is extended or adjusted under 35 U.S.C. 154(b) by 570 days.

(21) Appl. No.: 13/621,387

(22) Filed: Sep. 17, 2012

(65) Prior Publication Data
US 2013/0136128 A1 May 30, 2013

Related U.S. Application Data

(60) Provisional application No. 61/535,450, filed on Sep. 16, 2011.

(51) Int. Cl.
*H04L 29/12* (2006.01)
*H04L 12/741* (2013.01)
*H04L 12/46* (2006.01)

(52) U.S. Cl.
CPC ...... *H04L 61/2592* (2013.01); *H04L 12/4633* (2013.01); *H04L 45/74* (2013.01); *H04L 61/2507* (2013.01)

(58) Field of Classification Search
None
See application file for complete search history.

(56) References Cited

U.S. PATENT DOCUMENTS

| | | | |
|---|---|---|---|
| 6,977,896 B1* | 12/2005 | Kobayashi | H04L 12/5695 370/235 |
| 7,295,609 B2* | 11/2007 | Sato et al. | 375/240.03 |
| 7,606,191 B1* | 10/2009 | Breau | H04L 12/4641 370/328 |
| 8,095,786 B1* | 1/2012 | Kshirsagar et al. | 713/152 |

(Continued)

*Primary Examiner* — Hassan Kizou
*Assistant Examiner* — Roberta A Shand
(74) *Attorney, Agent, or Firm* — Sim & McBurney

(57) ABSTRACT

A method for encapsulating a packet of data from a data flow is described. The packet comprises a flow network header for identifying a source network address and a target destination network address and a flow transport network header for identifying a source port and a target destination port. The method comprises the following steps. The flow network header is replaced with an encapsulation network header for identifying an encapsulation network address and a decapsulation network address. The decapsulation network address specifies the address of a decapsulation node. The flow transport header is replaced with an encapsulation transport header for identifying an encapsulation port and a decapsulation port. The decapsulation port is configured to be the same as the target destination port. A method for decapsulating the encapsulated packet, as well as network nodes configured to implement the methods, are also described.

34 Claims, 6 Drawing Sheets

(56) References Cited

U.S. PATENT DOCUMENTS

| | | | |
|---|---|---|---|
| 8,331,404 B2* | 12/2012 | Law et al. | 370/497 |
| 8,755,383 B2* | 6/2014 | Keesara | 370/392 |
| 8,825,900 B1* | 9/2014 | Gross et al. | 709/238 |
| 2002/0042875 A1* | 4/2002 | Shukla | H04L 29/12009 713/151 |
| 2004/0088537 A1* | 5/2004 | Swander et al. | 713/153 |
| 2010/0138560 A1* | 6/2010 | Kivinen et al. | 709/246 |
| 2011/0283017 A1* | 11/2011 | Alkhatib et al. | 709/244 |

* cited by examiner

ENCAPSULATING TRAFFIC WHILE PRESERVING PACKET CHARACTERISTICS

The present invention relates generally to communication of data in a network and specifically to a system and method for encapsulating traffic for communication in the network while preserving packet characteristics of the encapsulated traffic. This application claims priority from U.S. Provisional Application No. 61/535,450 filed Sep. 16, 2011.

BACKGROUND

Encapsulation is an approach commonly used in networking to enhance services offered by a network to its clients. Many standardized encapsulation mechanisms have been defined, such as the Internet Security Protocol (IPsec), Internet Protocol in Internet Protocol (IP-in-IP), and Generic Routing Encapsulation (GRE). In all cases, an existing packet is taken, wrapped in a new packet, which is potentially based on a different protocol, and transmitted over the network. The wrapped, or encapsulated, packets make it appear as if all traffic being generated by the system is of a single protocol type. This makes it possible for new protocols to be deployed over an existing network without requiring all of the devices in the network be upgraded to support the new protocol. Today, encapsulation is used to provide security for client traffic using protocols such as IPsec to create a Virtual Private Network (VPN); provide IP version 6 (IPv6) support to IP version 4 (IPv4) networks using protocols such as 6in4, Teredo, and 6to4; and allow networks with conflicting address spaces to run over the same network using protocols such as GRE or IP-in-IP.

When an application initiates a connection to a remote device, it uses a "transport" protocol to organize the data. This transport protocol is run over a "network" protocol, traditionally IPv4. This combination of protocol layers is commonly referred to as the Open Systems Interconnection (OSI) network model. Hosts are identified by unique network addresses and applications use specified transport addresses to distinguish themselves from other applications running on the same host. The combination of source network and transport addresses, transport protocol, and destination network and transport addresses is referred to as a flow.

Network monitoring equipment typically operates on flows. Data for the flow is packetized. Referring to FIG. 1, a packet is illustrated generally by numeral 100. The data is separated into a plurality of data chunks, each data chunk forming a payload 104 of a corresponding packet 100. Each packet 100 has one or more flow headers 102. The flow headers include a network header 102a containing network addresses for the application and a transport header 102b containing transport addresses for the application. In a TCP/IP example, the network addresses include a destination IP address and a source IP address. The transport addresses include a destination port and a source port.

For each packet, network monitoring equipment evaluates the flow headers 102 and different operations are performed based upon a set of predefined rules. For example, certain flows may be blocked by firewalls, throttled by quality-of-service enforcers, or redirected by proxies. One assumption underlying the design of the network monitoring equipment is that the network and transport addresses are in the same location in every packet 100. This assumption makes it possible to offload much of the packet processing logic into hardware.

When the packet 100 is encapsulated, however, the flow headers 102 are obscured. Referring to FIG. 2, an encapsulated packet is illustrated generally by numeral 200. The original packet 100, inclusive of the flow headers 102 as well as the payload 104, is wrapped in encapsulation headers 202. The encapsulation headers include encapsulation flow headers 204 and a custom encapsulation header 206. The custom encapsulation header contains additional encapsulation information, such as routing or encryption information. The encapsulation flow headers 204 define an encapsulation tunnel and include an encapsulation network header 204a containing network addresses for the encapsulation tunnel and an encapsulation transport header 204b containing transport addresses for the encapsulation tunnel.

It is not possible for the network monitoring equipment to evaluate the encapsulated packets using the predefined rules because the flow headers being inspected represent the encapsulation tunnel rather than the original flow.

While it is theoretically possible for the network monitoring equipment to interpret the encapsulation scheme and examine the encapsulated packet to identify the flow, this is rarely done because of the number of different encapsulation systems that can be encountered. The number of different encapsulation systems also grows significantly as the system is scaled. Because of this, the computational power required to check every packet for encapsulated traffic would slow down existing systems considerably.

Accordingly, it is an object of the present invention to obviate or mitigate at least some of these disadvantages.

SUMMARY

The present invention makes it possible for existing network monitoring equipment to distinguish between different traffic flows that are encapsulated by the same system. This allows the network monitoring equipment to treat encapsulated flows in the same manner as if they were not encapsulated. Traffic filtering or quality-of-service can be applied to both encapsulated and non-encapsulated traffic.

In accordance with an aspect of the present invention there is provided a method for encapsulating a packet of data from a data flow, the packet comprising a flow network header for identifying a source network address and a target destination network address and a flow transport network header for identifying a source port and a target destination port, the method comprising the steps of: replacing the flow network header with an encapsulation network header for identifying an encapsulation network address and a decapsulation network address; the decapsulation network address specifying the address of a decapsulation node; and replacing the flow transport header with an encapsulation transport header for identifying an encapsulation port and a decapsulation port, the decapsulation port configured to be the same as the target destination port.

In accordance with a further aspect of the present invention there is provided a method for decapsulating an encapsulated packet of data, the encapsulation packet comprising an encapsulation network header for identifying an encapsulation network address and a decapsulation network address, and an encapsulation transport header for identifying an encapsulation port and a decapsulation port, the method comprising the steps of: replacing the encapsulation network header with a flow network header for identifying a source network address and a destination network address; and replacing encapsulation transport header with a flow transport header for identifying a source port and a target destination port, the decapsulation port being the same as the target destination port.

In accordance with yet a further aspect of the present invention there is provided a network node configured to encapsulate a packet of data from a data flow, the packet comprising a flow network header for identifying a source network address and a target destination network address and a flow transport network header for identifying a source port and a target destination port, the network node comprising: a processor; and memory for storing instructions, which when executed cause the processor to implement the steps of: replacing the flow network header with an encapsulation network header for identifying an encapsulation network address and a decapsulation network address; the decapsulation network address specifying the address of a decapsulation node; and replacing the flow transport header with an encapsulation transport header for identifying an encapsulation port and a decapsulation port, the decapsulation port configured to be the same as the target destination port.

In accordance with yet a further aspect of the present invention there is provided a network node configured to decapsulate an encapsulated packet of data, the encapsulation packet comprising an encapsulation network header for identifying an encapsulation network address and a decapsulation network address, and an encapsulation transport header for identifying an encapsulation port and a decapsulation port, the network node comprising: a processor; and memory for storing instructions, which when executed cause the processor to implement the steps of: replacing the encapsulation network header with a flow network header for identifying a source network address and a destination network address; and replacing encapsulation transport header with a flow transport header for identifying a source port and a target destination port, the decapsulation port being the same as the target destination port.

BRIEF DESCRIPTION OF THE DRAWINGS

Embodiments of the invention will now be described by way of example only with reference to the following drawings in which.

DETAILED DESCRIPTION OF THE PREFERRED EMBODIMENTS

Figure 1:
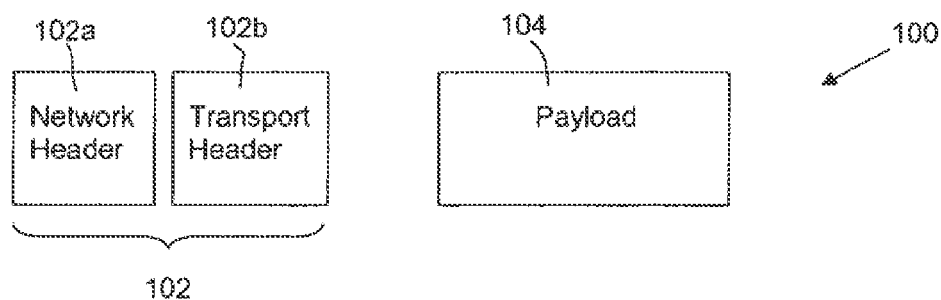
FIG. 1 is a block diagram of a data packet (prior art)
Figure 2:
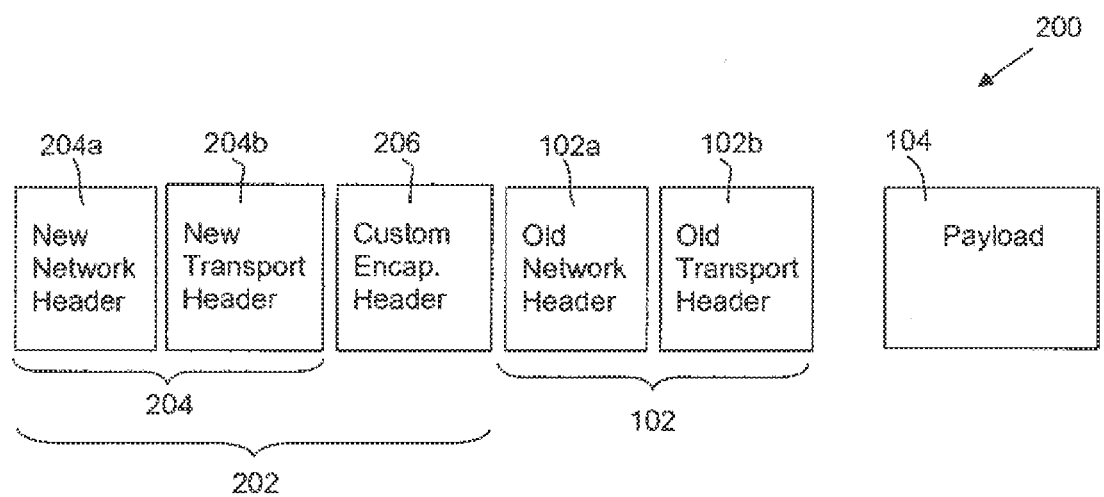
FIG. 2 is a block diagram of an encapsulated data packet (prior art)
Figure 3:
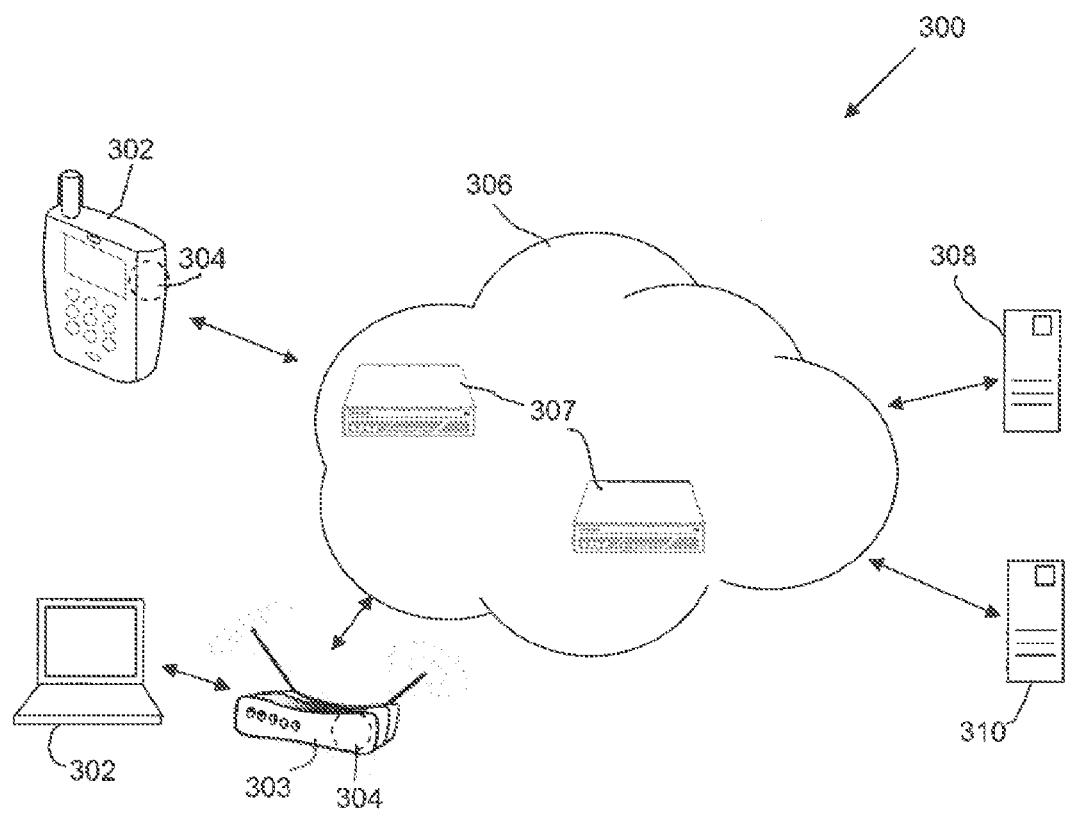
FIG. 3 is a block diagram of an encapsulation system.

For convenience, like numerals in the description refer to like structures in the drawings. Referring to FIG. 3, an encapsulation system is illustrated generally by numeral 300. The encapsulation system 300 includes a plurality of clients 302, a plurality of encapsulation nodes 304, a communication network 306, a plurality of decapsulation nodes 308 and a plurality of target destination servers 310. For ease of explanation only, one of each of the clients 302, encapsulation nodes 304, decapsulation nodes 308 and target destination servers 310 are shown and described.

The client 302 may include both wired and wireless computing devices such as a desktop computer, a notebook, a tablet or other portable computer, a smart phone, a personal digital assistant (PDA), and the like. The client 302 includes at least one of the encapsulation nodes 304. The encapsulation node 304 may be integrated into the client 302 or a peripheral device 303 with which the client 302 communicates, such as a router, modem or the like. The encapsulation node 304 is configured to encapsulate data as will be described. Each encapsulation node 304 may further include redundancy software configured to establish and manage redundant connections with a plurality of the decapsulation nodes 308.

The communication network 306 may include a wide area network (WAN) and/or a local area network (LAN). This includes, for example, public networks such as the Public Switched Telephone Network (PSTN) and the Internet, as well as private networks or Intranets. Further, the communication network includes network monitoring equipment 307. The network monitoring equipment 307 regulates flow of data there through. As will be appreciated, examples of the network monitoring equipment 307 includes firewalls, quality-of-service enforcers, and proxies. The actual configuration of the communication network 306 may vary, depending on the implementation, as will be appreciated by a person of ordinary skill in the art.

The decapsulation node 308 is configured to decapsulate data received from the encapsulation node 304. The decapsulation node 308 is further configured to route the decapsulated data to the target destination server 310. Depending on the implementation, the decapsulation node 308 and the target destination server 310 may be implemented by the same device. Alternatively, the decapsulation node 308 may communicate directly with the target destination server 310. Yet alternatively, the decapsulation node 308 may communicate with the target destination server 310 via the communication network 306.

In the encapsulation system 300 two layers of address translation are performed, one at the encapsulation node 304 and one at the decapsulation node 308. At the encapsulation node 304, a source address of traffic from a virtual IP address associated with a source application is translated to a source address associated with the physical network interface connecting device 302 or 303 to the network 306, at both the network and transport layer. Specifically, the source address is translated to identify the physical interface address of the device 302 or 303 as connected to the communication network 306 and, possibly, a different source port. Further, the destination address of the traffic is translated from the address of the target destination server 310 to the address of the decapsulation node 308.

At the decapsulation node 308 the source address is translated from the physical interface address back to the virtual address and the destination address is translated from the address of the decapsulation node 308 back to the address of the destination target server 310, before sending packets on to the target destination server 310. This mechanism, referred to as double Network Address Translation (NAT), is described in greater detail in Applicant's copending PCT Patent Application Publication No. WO/2011/153618 titled "Transmitting Data Over a Plurality of Different Networks".

The encapsulation system 300 above is described with reference to data flowing from the client 302 to the target destination server 310. As will be appreciated by a person of ordinary skill in the art, the target destination server 310 can provide data to the client 302. In such a case, the decapsulation node 308 will act as the encapsulate node 302 and encapsulate the response. Similarly, the encapsulation node 304 will act as the decapsulation node 308 and decapsulate the response.

Figure 4:
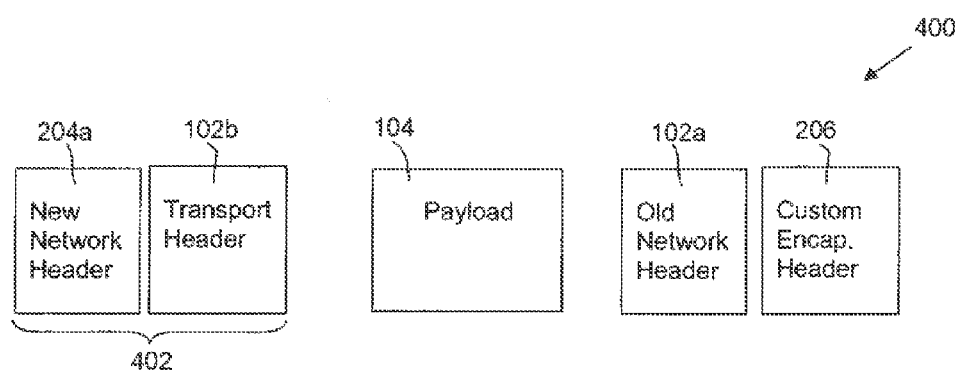
FIG. 4 is a block diagram of an encapsulated data packet in accordance with an embodiment.

Referring to FIG. 4, an encapsulated packet in accordance with an embodiment of the present invention is illustrated generally by numeral 400. In this embodiment, the encapsulated packet 400 includes a hybrid header 402. The hybrid header 402 includes the encapsulation network header 204a for identifying the network addresses for the packet 400, and the flow transport header 102b, for identifying the transport addresses for the packet 400. The payload 104 is located in its typical location. The flow network header 102a and the custom encapsulation header 206 follow the payload 104. As will be appreciated by a person of ordinary skill in the art, the hybrid header 402 may include other standard headers (not shown), depending on the protocol used. Also, as will be appreciated, the specific location of the encapsulation network header 204a and the flow transport header 102b within the hybrid header 402 depends on the protocol being used.

Figure 5A:
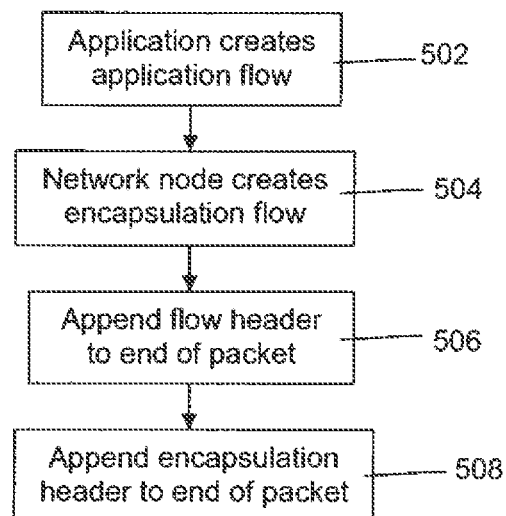
FIGS. 5a and 5b are flow charts illustrating operation of the network infrastructure for encapsulating and decapsulating the packet illustrated in FIG. 4.

Referring to FIG. 5a, a flow chart illustrating the steps taken to encapsulate the packet is shown generally by numeral 500. At step 502, an application generates an application flow. In this example, the flow network header 102a includes a source address Tunnel IP and a destination address Target Destination Server. The flow address header 102b include a source port Client Application Port and a destination port Application Port.

The encapsulation node 304 encapsulates packets received for the application flow. Specifically, at step 504, the encapsulation node 304 creates an encapsulation flow and encapsulations the packets accordingly. In this example, the flow network header 102a is replaced with the encapsulation network header 204a. The encapsulation network header 204a includes an encapsulation source address Physical Interface IP and an encapsulation destination address Decapsulation Node. The flow address header 102b remains the same.

At step 506 the flow network header 102a is added to the packet 400 at a first predefined location. In the present embodiment, the first predefined location is after the payload 104. At step 508 the custom encapsulation header 206 is added to the packet 400 at a second predefined location. The encapsulation header 206 contains information that the decapsulation node 308 will use to properly decapsulate the packet and route it once it is received. For example, in a VPN system the encapsulation header may contain a unique identifier to associate the packet with the encryption key used to decrypt the packet at the decapsulation node 308. In the present embodiment, the second predefined location is after the flow network header 102a.

The encapsulated packet 400 is then ready to be transmitted to the decapsulation node 308. As previously noted, although the flow chart 500 is described with reference to transmitting packets from the client 302 to the destination server 310, similar steps would be taken by the decapsulation node 308 when transmitting data to the encapsulation node 302.

Figure 5B:
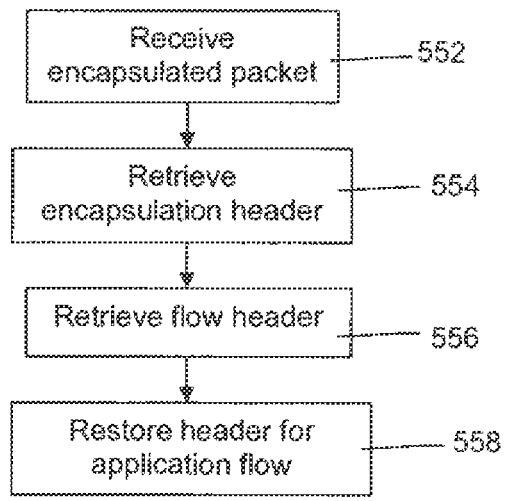

Referring to FIG. 5b, a flow chart illustrating the steps taken to decapsulate the encapsulated packet 400 is shown generally by numeral 550. At step 552, the decapsulation node 308 receives the encapsulated packet 400. At step 554 the custom encapsulation header 206 is retrieved from the packet 400 at the second predefined location. At step 556 the flow network header 102a is retrieved from the packet 400 at the first predefined location.

At step 558 the encapsulation network header 204a is replaced with the flow network header 102a. Thus, the source address Tunnel IP and the destination address Destination Server return to their original values. The decapsulated packet is then ready to be transmitted to the target destination server 310.

As described above, the flow network header 102a is replaced with the encapsulation network header 204a, and the transport header 102b is not changed during encapsulation. Thus the encapsulation system 300 effectively 'reuses' the flow transport header 102b, removing the requirement of having an extra transport header in the encapsulated packet 200. Further, keeping the flow transport header 102a in its traditional position and followed by the payload 104 in the encapsulated packet 400 allows the network monitoring equipment to interpret the encapsulated packet 400 as if it was not encapsulated.

Although the flow network header 102a changes during encapsulation, in practise, such a change is unlikely to significantly impact the effectiveness of the network monitoring equipment as most rules are based upon the destination transport address. The network addresses are used in few scenarios by the network monitoring equipment, as transport header information allows for more granular traffic classification. The network address is rarely specific enough to identify the traffic characteristics, necessitating inspection of the higher level address. Thus, encapsulating packets as described above allows existing network monitoring equipment 107 to be used while reducing effects, such as improper throttling for example, as a result of the encapsulation.

It should be noted that implementing the encapsulation system 300 as described in the present embodiment might require kernel-level access at the encapsulation node 304 and/or the decapsulation node 308. Although this is not always practical, many existing encapsulation systems, such as IPsec, GRE, and IP-in-IP are already implemented in the kernel, obviating this concern. However, for encapsulation systems that are not implemented in the kernel, using a kernel module may simplify their implementation. An example of such a kernel module is the Linux-based netfilter.

Figure 6:
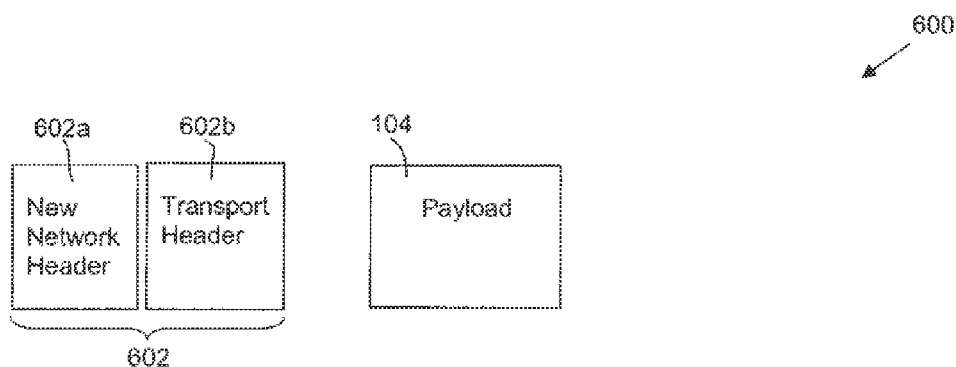
FIG. 6 is a block diagram of an encapsulated data packet in accordance with an alternative embodiment.

Referring to FIG. 6, an encapsulated packet in accordance with an alternative embodiment of the present invention is illustrated generally by numeral 600. In this embodiment, the encapsulated packet 600 includes a hybrid header 602. The hybrid header 602 includes an encapsulation flow network header 602a and an encapsulation flow transport header 602b. The payload 104 is located in its typical location. However, in contrast to the embodiment described with reference to FIG. 4, the flow network header 102a and the custom encapsulation header 206 are not included in the encapsulated packet 600.

Rather, in this embodiment the encapsulation node 304 and the decapsulation node 308 use the encapsulated packets 600 to create an encapsulation flow there between, mimicking the application flow. A separate channel, or out-of-band mechanism, is used to communicate encapsulation information, such as the flow network header 102a and the custom encapsulation header 206. The out-of-band mechanism avoids sending additional data over the same link as the encapsulation flow, which may confuse traffic filters. The decapsulation node 308 uses the information received out-of-band to establish its own connection to the target destination server 310.

Figure 7A:
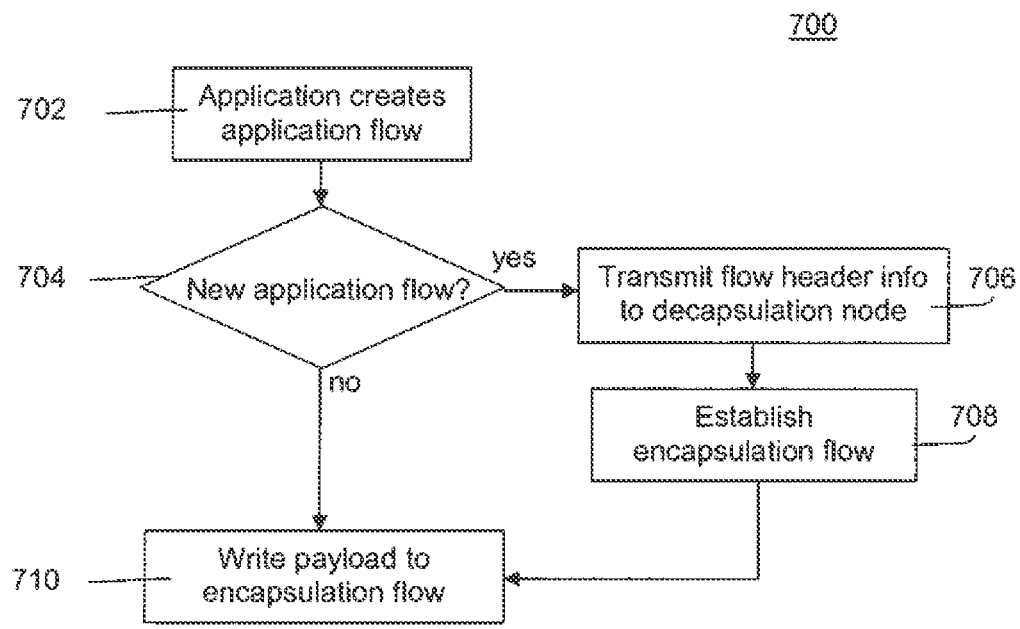
FIGS. 7a and 7b are flow charts illustrating operation of the network infrastructure for encapsulating and decapsulating the packet illustrated in FIG. 6.

Referring to FIG. 7a, a flow chart illustrating the steps taken to encapsulate the packet 600 is shown generally by numeral 700. At step 702, an application generates the application flow. In this example, the application flow comprises the flow network header 102a including a source address Tunnel IP and a destination address Destination Server. The application flow also comprises the flow transport header 102b, including a source port Client Application Port and a destination port Application Port.

At step 704, the encapsulation node 304 determines whether the packet represents a start packet from a new application flow. If the packet does not represent the start of a new application flow, the encapsulation node 304 continues at step 710. If the packet represents the start packet from a new application flow, then at step 706, the encapsulation node 304 transmits header information to the decapsulation node 308 using the separate channel. The transmitted header information includes the network addresses, the transport addresses and a flow identifier (ID) for identifying subsequent packets belonging to the application flow. The decapsulation node 308 may be required to acknowledge the header information.

At step 708, the encapsulation flow between the encapsulation node 304 and the decapsulation node 308 is established. In this example, the encapsulation flow network header 602a includes a source address Physical Interface IP and a destination address Decapsulation Node. The encapsulation flow transport header 602b includes a source port Random Encapsulation Node Port and a destination port Application Port. The destination port Application Port of the encapsulation flow transport header 602b and the destination port Application Port of the application flow transport header 102b are the same. Further, the flow header includes the flow ID. For example, the flow ID can be included in an "options" field of the encapsulation flow network header 602a when using IPv4.

At step 710, the encapsulation 304 node retrieves the payload from the packet and writes it to the newly created connection for the encapsulation flow, thereby transmitting the payload to the decapsulation node 308.

Figure 7B:
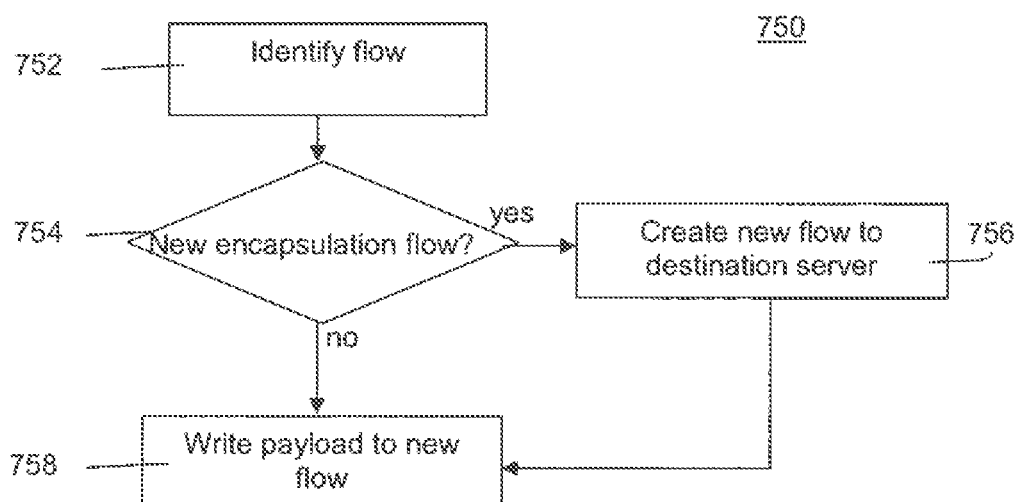

Referring to FIG. 7b, a flow chart illustrating the steps taken to decapsulate the encapsulated packet 600 is shown generally by numeral 750. At step 752, the decapsulation node 308 receives the packet 600 from the encapsulation node 304. At step 752, the decapsulation node 308 determines the flow being mimicked by the encapsulation flow. In this embodiment, the flow is determined by retrieving the flow ID.

At step 754, it is determined if the received packet 600 represents a new encapsulation flow. If the received packet 600 represents a new encapsulation flow then at step 756 a new flow between the decapsulation node 308 and the target destination server 310 is created using the header information previously received from the encapsulation node 304. The new flow comprises the flow network header 102a, including the source address Tunnel IP and the destination address Destination Server, and the flow transport header 102b, including the source port Client Application Port and the destination port Application Port. At step 756, the payload is written to this newly created connection.

As described above, the flow ID is used to correlate the packets 600 received at the decapsulation node 308 with the corresponding application flow. However, it will be appreciated that the header information could include other information for correlating the packets 600 with the corresponding application flow. That is, rather than the flow ID, the header information could include the encapsulation flow headers 602 and the application flow headers 102. Thus, the decapsulation node 308 would be able to correlate received packets based on a known association between the encapsulation flow headers 602 and the application flow headers 102.

Although a random encapsulation port is used as the source port for the encapsulation flow transport header 602b, the application port of the flow transport header 102b may also be used. Thus, similar to the first embodiment, the flow transport header 102b can be reused and would not need to be transmitted to the decapsulation node 308 along with the header information.

Unlike the previous embodiment, this embodiment is designed to work without requiring kernel-level access. Implementation of the encapsulation mechanism can be accomplished using a typical user-space encapsulation daemon which has access to network traffic using a typical tunnel kernel module. When the encapsulation system detects a first packet from a new application flow it establishes a "matching" encapsulation flow between the encapsulation node 304 and the decapsulation node 308. The out-of-band channel is used to communicate configuration information of the corresponding application flow to the decapsulation node 308. Then, the payload 104 from the application flow is transmitted over the encapsulation flow. When the payload 104 is received, the configuration information for the corresponding application flow is retrieved and the payload 104 is transmitted to the target destination server 310. This embodiment provides a number of advantages. For example, additional header information is not required to be transmitted along with each packet 600, reducing overhead. In the example in which the flow ID is used, the flow ID is the only extra header information transmitted along with each packet 600. In the example in which the flow ID is not used, no extra header information is transmitted along with each packet 600.

In yet an alternative embodiment, the same packet 600 as described with reference to FIG. 6 can be employed. In this embodiment, however, an out-of-band or separate communication channel is not required. That is, certain application-level protocols include the destination information for the target destination server in an application-level header. For example, Hypertext Transfer Protocol (HTTP) includes the destination information in a Host header field.

Accordingly, in the present embodiment, the decapsulation node 308 is configured to parse the payload 104 in order to properly route data. That is, the decapsulation node 308 examines the payload 104 to retrieve the application-level headers. The application-level headers are then parsed to determine to which host the packet 600 needs to be forwarded. Continuing the HTTP example, the decapsulation node can retrieve the Host: header field from the packet 600 for an HTTP connection.

Figure 8A:
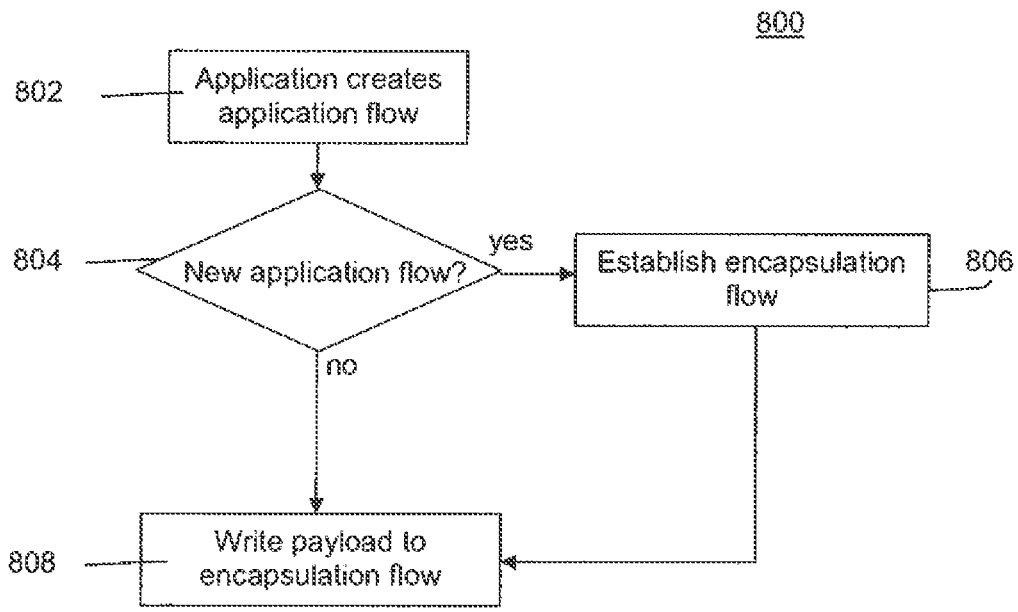
FIGS. 8a and 8b are flow charts illustrating alternate operation of the network infrastructure for encapsulating and decapsulating the packet illustrated in FIG. 6.

Referring to FIG. 8a, a flow chart illustrating the steps taken to encapsulate the packet 600 in accordance with this embodiment is shown generally by numeral 800. At step 802, an application generates the application flow. In this example, the application flow comprises the flow network header 102a including a source address Tunnel IP and a destination address Destination Server. The application flow also comprises the flow transport header 102b, including a source port Client Application Port and a destination port Application Port.

At step 804, the encapsulation node 304 determines whether a received packet represents a start packet from a new application flow. If the packet does not represent the start of a new application flow, the encapsulation node 304 continues at step 808. If the packet represents the start packet from a new application flow, then at step 806, an encapsulation flow between the encapsulation node 304 and the decapsulation node 308 is established. In this example, the encapsulation flow network header 602a includes a source address Physical Interface IP and a destination address Decapsulation Node. The encapsulation flow transport header 602b includes a source port Random Encapsulation Node Port and a destination port Application Port. The destination port Application Port of the encapsulation flow transport header 602b and the destination port Application Port of the application flow transport header 102b are the same. Further, the encapsulation flow is created using the same protocol type and the same destination port as the application flow.

At step 808, the encapsulation node 304 retrieves the payload from the packet and writes it to the newly created connection for the encapsulation flow, thereby transmitting the payload to the decapsulation node 308.

Figure 8B:
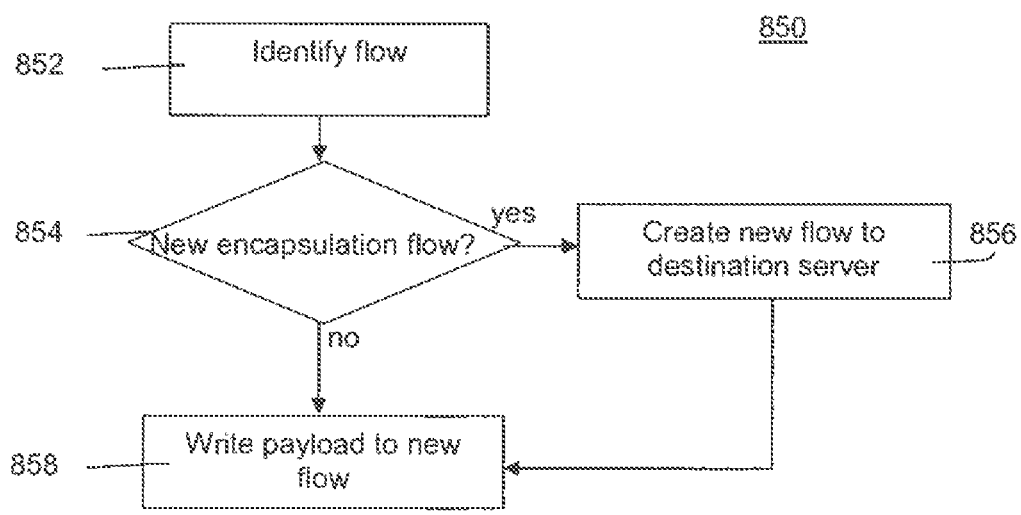

Referring to FIG. 8b, a flow chart illustrating the steps taken to decapsulate the encapsulated packet 600 is shown generally by numeral 850.

At step 852, the decapsulation node 308 receives the packet 600 from the encapsulation node 304. At step 852, the decapsulation node 308 examines the application-level header to determine to which host the payload 106 needs to be forwarded. For example, the decapsulation node 308 can parse the Host header field for an HTTP connection.

At step 854, it is determined whether the received packet 600 represents a new encapsulation flow. If the received packet 600 represents a new encapsulation flow then at step 856 a new connection between the decapsulation node 308 and the target destination server 310 is created using the information retrieved from the application-level header. The new flow comprises the flow network header 102a, including the source address Tunnel IP and the destination address Destination Server, and the flow transport header 102b, including the source port Client Application Port and the destination port Application Port. At step 756, the payload is written to this newly created connection.

As will be appreciated, this embodiment works well with application protocols that include an application-level header identifying the target destination server 310. Accordingly, this embodiment may be used in conjunction with one or more of the other embodiments to provide encapsulation for applications that do not use such application protocols.

Thus it will be appreciated that the present invention makes it possible to encapsulate data transmitted between two network nodes while permitting existing network monitoring equipment to distinguish between different traffic flows. This allows the network monitoring equipment to treat encapsulated flows as if they were not encapsulated. The embodiments are described above with reference to IP and TCP protocols for example only. A person of ordinary skill in the art will appreciate that the present invention may also be implemented using other protocols.

Also, as previously mentioned, the network nodes are described as the encapsulation node 304 and the decapsulation node 308 for ease of explanation only. As will be appreciated by a person of ordinary skill in the art, each of the encapsulation node 304 and the decapsulation node 308 are network nodes that can perform encapsulation or decapsulation, depending on the direction of the traffic.

Using the foregoing specification, the invention may be implemented as a machine, process or article of manufacture by using standard programming and/or engineering techniques to produce programming software, firmware, hardware or any combination thereof.

Any resulting program(s), having computer-readable instructions, may be stored within one or more computer-usable media such as memory devices or transmitting devices, thereby making a computer program product or article of manufacture according to the invention. As such, functionality may be imparted on a physical device as a computer program existent as instructions on any computer-readable medium such as on any memory device or in any transmitting device, that are to be executed by a processor.

Examples of memory devices include, hard disk drives, diskettes, optical disks, magnetic tape, semiconductor memories such as FLASH, RAM, ROM, PROMS, and the like. Examples of networks include, but are not limited to, the Internet, intranets, telephone/modem-based network communication, hard-wired/cabled communication network, cellular communication, radio wave communication, satellite communication, and other stationary or mobile network systems/communication links.

A machine embodying the invention may involve one or more processing systems including, for example, computer processing unit (CPU) or processor, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

Using the description provided herein, those skilled in the art will be readily able to combine software created as described with appropriate general purpose or special purpose computer hardware to create a computer system and/or computer subcomponents embodying the invention, and to create a computer system and/or computer subcomponents for carrying out the method of the invention.

Although preferred embodiments of the invention have been described herein, it will be understood by those skilled in the art that variations may be made thereto without departing from the scope of the appended claims.

What is claimed is:

1. A method for encapsulating a packet of data from a data flow, the packet comprising a flow network header for identifying a source network address and a target destination network address and a flow transport header for identifying a source port and a target destination port, the method comprising:

replacing the flow network header with an encapsulation network header for identifying an encapsulation network address and a decapsulation network address; the decapsulation network address specifying the address of a decapsulation node; and replacing the flow transport header with an encapsulation transport header having a destination port configured to be the same as the target destination port.

2. The method of claim 1 comprising the further step of creating an encapsulation header including information to be used when decapsulating the packet.

3. The method of claim 2 wherein the encapsulation transport header is the same as the flow transport header.

4. The method of claim 3 comprising the further steps of relocating the flow network header to a first predetermined location within the packet and relocating the encapsulation header to a second predetermined location within the packet.

5. The method of claim 2 comprising the further step of transmitting header information header to a decapsulation node using a separate channel from the packet.

6. The method of claim 5, wherein the header information includes one or more of the source network address, the target destination network address, the source port, the target destination port or the encapsulation network header.

7. The method of claim 6 comprising the further steps of creating a flow identifier for associating the flow network header with the encapsulated packet, and adding the flow identifier to packet.

8. The method of claim 7 wherein the flow identifier is included in the encapsulation network header.

9. The method of claim 1 wherein the encapsulation transport header is the same as the flow transport header.

10. The method of claim 9 comprising the further step of relocating the flow network header to a first predetermined location within the packet.

11. The method of claim 1 comprising the further step of transmitting header information header to a decapsulation node using a separate channel from the packet.

12. The method of claim 11, wherein the header information includes one or more of the source network address, the target destination network address, the source port or the target destination port.

13. The method of claim 12 comprising the further steps of creating a flow identifier for associating the flow network header with the encapsulated packet, and adding the flow identifier to the packet.

14. The method of claim 13 wherein the flow identifier is further included in the encapsulation network header.

15. A method for decapsulating an encapsulated packet of data, the encapsulation packet comprising an encapsulation network header for identifying an encapsulation network address and a decapsulation network address, and an encapsulation transport header for identifying an encapsulation port and a target destination port, the method comprising:
   replacing the encapsulation network header with a flow network header for identifying a source network address and a destination network address; and
   replacing the encapsulation transport header with a flow transport header having a destination port configured to be the same as the target destination port.

16. The method of claim 15 comprising the further step of retrieving the flow network header from a first predetermined location within the packet.

17. The method of claim 16 comprising the further step of retrieving an encapsulation header from a second predetermined location within the packet.

18. The method of claim 15 comprising the further step of receiving header information header from an encapsulation node via a separate channel from the packet.

19. The method of claim 18, wherein the header information includes one or more of the source network address, the target destination network address, the source port or the target destination port.

20. The method of claim 18, wherein the encapsulated packet further includes a first flow identifier and the header information further includes a second flow identifier the packet is associated with corresponding header information by comparing the first and second flow identifiers.

21. The method of claim 20 wherein header information further includes an encapsulation header.

22. The method of claim 20 wherein the destination network address and the target destination port are derived from information available within a payload of the packet.

23. The method of claim 22 wherein the destination network address and the target destination port are derived from an application-layer header.

24. A network node configured to encapsulate a packet of data from a data flow, the packet comprising a flow network header for identifying a source network address and a target destination network address and a flow transport header for identifying a source port and a target destination port, the network node comprising:
   a processor; and
   memory for storing instructions, which when executed cause the processor to implement the steps of:
      replacing the flow network header with an encapsulation network header for identifying an encapsulation network address and a decapsulation network address; the decapsulation network address specifying the address of a decapsulation node; and
      replacing the flow transport header with an encapsulation transport header having a destination port configured to be the same as the target destination port.

25. The network node of claim 24 comprising further instruction for creating an encapsulation header including information to be used when decapsulating the packet.

26. The network node of claim 24 wherein the encapsulation transport header is the same as the flow transport header.

27. The network node of claim 26 comprising further instruction for relocating the flow network header to a first predetermined location within the packet.

28. The network node of claim 24 comprising further instruction for transmitting header information header to a decapsulation node using a separate channel from the packet.

29. The network node of claim 28, wherein the header information includes one or more of the source network address, the target destination network address, the source port or the target destination port.

30. The network node of claim 29 comprising further instruction for creating a flow identifier for associating the flow network header with the encapsulated packet, and adding the flow identifier to the packet.

31. A network node configured to decapsulate an encapsulated packet of data, the encapsulation packet comprising an encapsulation network header for identifying an encapsulation network address and a decapsulation network address, and an encapsulation transport header for identifying an encapsulation port and a target destination port, the network node comprising:
   a processor; and
   memory for storing instructions, which when executed cause the processor to implement the steps of:
      replacing the encapsulation network header with a flow network header for identifying a source network address and a destination network address; and
      replacing the encapsulation transport header with a flow transport header having a destination port configured to be the same as the target destination port.

32. The network node of claim 31 comprising further instruction for retrieving the flow network header from a first predetermined location within the packet.

33. The network node of claim 32 comprising further instruction for retrieving an encapsulation header from a second predetermined location within the packet.

34. The network node of claim 31 comprising further instruction for receiving header information header from an encapsulation node via a separate channel from the packet.

* * * * *